United States Patent
Romero et al.

[19]

[11] Patent Number: 5,955,801
[45] Date of Patent: Sep. 21, 1999

[54] MICROFABRICATED MICROENGINE WITH CONSTANT ROTATION RATE

[75] Inventors: Louis A. Romero; Fred M. Dickey, both of Albuquerque, N.Mex.

[73] Assignee: Sandia Corporation, Albuquerque, N.Mex.

[21] Appl. No.: 08/982,098

[22] Filed: Dec. 1, 1997

[51] Int. Cl.⁶ .............................. H02K 7/00; H02K 7/06; F16H 21/22
[52] U.S. Cl. ..................... 310/40 MM; 310/42; 310/80; 310/37; 310/112
[58] Field of Search ........................... 310/309, 40 MM, 310/42, 45, 75 R, 83, 80, 37, 112; 427/128, 129, 130, 131, 132; 29/596, 598

[56] References Cited

U.S. PATENT DOCUMENTS

| | | | |
|---|---|---|---|
| 5,206,983 | 5/1993 | Guckel et al. | 310/40 MM |
| 5,631,514 | 5/1997 | Garcia et al. | 310/309 |

OTHER PUBLICATIONS

Mehran Mehregany, Stephen D. Senturia, and Jeffrey H. Lang, *Friction and Wear in Microfabricated Harmonic Side–Drive Motors*, IEEE Solid State Sensor and Actuator Workshop, Hilton Head Island, S.C., Jun. 4–7. IEEE Catalogue No. 90CH2783–9, pp. 17–22.

Primary Examiner—Thomas M. Dougherty
Assistant Examiner—B. Mullins
Attorney, Agent, or Firm—V. Gerald Grafe

[57] ABSTRACT

A microengine uses two synchronized linear actuators as a power source and converts oscillatory motion from the actuators into constant rotational motion via direct linkage connection to an output gear or wheel. The microengine provides output in the form of a continuously rotating output gear that is capable of delivering drive torque at a constant rotation to a micromechanism. The output gear can have gear teeth on its outer perimeter for directly contacting a micromechanism requiring mechanical power. The gear is retained by a retaining means which allows said gear to rotate freely. The microengine is microfabricated of polysilicon on one wafer using surface micromachining batch fabrication.

19 Claims, 5 Drawing Sheets

5,955,801

MICROFABRICATED MICROENGINE WITH CONSTANT ROTATION RATE

This invention was made with Government support under Contract DE-AC04-94AL85000 awarded by the U.S. Department of Energy. The Government has certain rights in the invention.

BACKGROUND OF THE INVENTION

The present invention relates generally to microengines or micromotors. More specifically, the invention is directed to a microengine microfabricated of polysilicon having an output gear that is rotated by synchronized linear actuators that are linked to the output gear in order to cause constant rotation of the gear, thus providing a source of torque to micro-mechanisms requiring mechanical energy. The invention is adaptable to applications involving defense, biomedical, manufacturing, consumer products, aviation, automotive, computer (micro hard disks), inspection, and safety systems.

In the field of micromechanics, mechanical devices are of the scale of micrometers. A suitable power source for supplying continuous, constant rotational motion to other micro-mechanisms does not currently exist. There are micrometer sized electrostatic microengines that display rotational motion but are unable to drive a mechanical load. This is due to several reasons which chief among them is the inability to produce an output shaft from the microengine. Furthermore, there is great difficulty in connecting a mechanical load to the perimeter of the rotor itself because the location of stators which are used to electrostatically or electromagnetically drive the device interfere with external connections.

As explained in Mehregany et al. "Friction and Wear in Microfabricated Harmonic Side-Drive Motors", IEEE Solid State Sensor and Actuator Workshop, Hilton Head Island. S.C. June 4–7. IEEE Catalogue No. 90CH2783-9, pages 17–22, conventional microengines include a rotor pinned to a substrate or stator by a central bearing that restricts its lateral and axial motion. The entire structure shown in Mehregany was micromachined from silicon using deposition and etching steps referred to as surface micromachining in the art. The manner of energizing the rotor is via a variable-capacitance side-drive arrangement wherein stator poles are arranged about the periphery of the rotor. By appropriate energization of the side-deposited stator poles using a multiphase signal, rotation of the rotor is achieved.

The existing microengine comprises a typical center-pin bearing side-drive microengine. In this side-drive design, torque is derived via position-dependent capacitance between the rotor and stator poles. However, because of the side-by-side arrangement of the rotor and stator poles, field coupling is less than optimal and, as a result, the torque characteristics of the microengine suffer. Furthermore, the twelve stators surrounding the perimeter of the 8-pole rotor connected to the center-pin bearing make access to the rotor difficult. The rotor itself does not allow transmission of power off its perimeter because gear teeth cannot be used. Also, the center pin about which the rotor rotates is fixed and cannot serve as a shaft for power take-off.

Garcia et al., U.S. Pat. No. 5,631,514, incorporated herein by reference, discloses a microfabricated microengine that provides direct output mechanical power directly to micromechanisms without interference from the structure of the micromotor. In Garcia, however, the rotation rate of the microengine was widely variable. Garcia proposed a feedback control loop to achieve constant rotation rates; in practice, however, even the feedback control loop yielded varying rotation rates.

Thus, there is an existing need for a microengine that will provide direct output, constant rotation mechanical power directly to micromechanisms without interference from the structure of the microengine, and that can provide constant rotation rates.

SUMMARY OF THE INVENTION

The present invention provides constant rotation rate output power to a micromechanism load directly from a rotating motor gear. Stators and rotors are not used in the present invention's design. Unlike the prior art, this invention uses synchronized linear actuators as the power source which converts linear oscillatory motion from the linear actuators into rotational motion via a direct linkage connection near the perimeter of an output gear. System masses, spring constants, linkage dimensions, and drive functions are selected to yield a microengine capable of producing a constant rotation rate. The microengine design provides output in the form of a continuously rotating, with a constant rotation rate, output gear that is capable of delivering drive torque directly to a micromechanism. The microengine can be operated at varying speeds and its direction of rotation can be reversed. The entire microengine is fabricated of polysilicon on one wafer using surface micromachining batch fabrication techniques. Fabrication of the microengine is accomplished without the need for assembly of multiple wafers requiring alignments, bonding, or the addition of other separately fabricated piece parts.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

The present invention provides a microengine that provides output mechanical power directly to micromechanisms without interference from the structure of the micromotor, and that can provide constant rotation rates.

Figure 1:
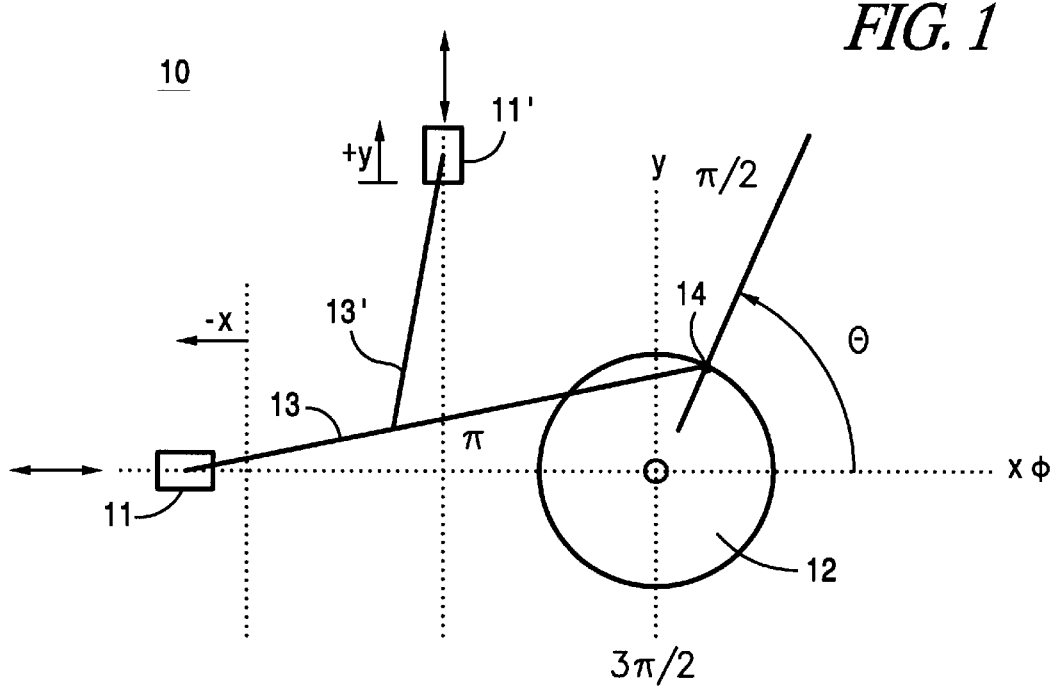
FIG. 1 is a schematic of the basic conversion of linear motion to rotational motion as provided by the present invention.

Referring to FIG. 1, microengine 10 provides output in the form of a continuously rotating output gear 12 that is capable of delivering drive torque to a micromechanism (not shown). Microengine 10 uses linear actuators 11, 11' as a power source, and converts linear oscillatory motion from linear actuators 11, 11' into rotational motion of output gear 12 via direct linkages 13, 13'. Linear actuators that can be used to drive microengine 10 include electrostatic actuators, electromagnetic actuators, pneumatic actuators, piezoelectric actuators, shape memory alloy actuators, and phase change actuators. A prototype of the invention utilizes the linear electrostatic comb drive actuator wherein a comb drive actuator is used as the power source and the embodiment converts linear oscillatory motion from comb drive actuators into rotational motion via a direct linkage to the outer perimeter of output gear 12. Output gear 12 is rotated by forces applied thereto through linkages 13, 13', connected to output gear 12 at joint 14, as a result of synchronized motion of the actuators 11, 11' along the X and Y axes, respectively. For rotation of output gear 12 to occur, output gear 12 is rotated from 0 to $\pi/2$ radians by movement of actuator 11 in the negative X direction while actuator 11' is pulling in the positive Y direction. Output gear 12 is then rotated from $\pi/2$ to $\pi$ radians by the continued pulling of actuator 11 in the negative X direction and a pushing of actuator 11' in the negative Y direction. Output gear 12 is then rotated from $\pi$ to $3\pi/2$ radians by the continued pushing of actuator 11' in the negative Y direction as well as the pushing of actuator 11 in the positive X direction. Output gear 12 completes its 360° rotation ($2\pi$ radians) through the continued pushing of actuator 11 in the positive X direction and the pulling of actuator 11' in the positive Y direction. Actuators 11 and 11' continue this process resulting in continued rotation of output gear 12. Output gear 12 can also reverse its rotation by reversing the operation of actuators 11 and 11'.

Figure 2:
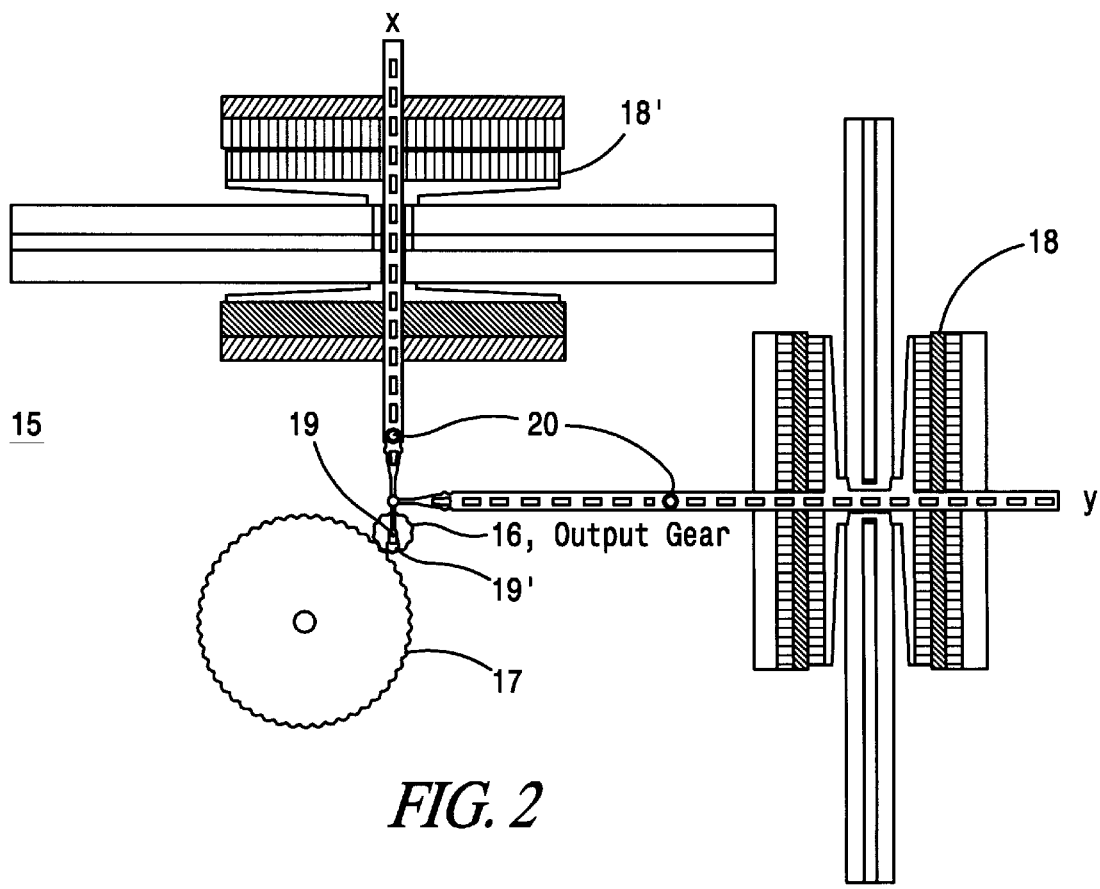
FIG. 2 is an illustration of a microengine according to the present invention.

Referring to FIG. 2, microengine 15 provides output in the form of a continuously rotating output gear 16 that is capable of delivering drive torque to a micromechanism which is depicted as a load gear 17. Comb drive actuators 18, 18' are shown in their respective locations on the X and Y axes, respectively. Direct linkage system 19 and 19' illustrates how linkage to output gear 16 is established. A first comb drive actuator 18' is directly linked near the outer perimeter of output gear 16 by a pin joint 19'. A second comb drive actuator 18 is then linked to the linkage mechanism of the first actuator 18' by an interconnecting link 19 which is also a pin joint. The linkages for both comb drive actuators have pin joints 20 to allow for motion of the linkages and output gear 16. Flexibility can be accomplished by incorporating either pin joints 20 as illustrated or by using elastic material joints which is well known in the art. For example, elastic joints rather than pin joints could be used in place of pin joints 19, 20. An elastic joint is a thin section that replaces a pin joint and allows for relative motion by the bending action of the thin section (see FIG. 6). Pin joint 19' which is connected to output gear 16 must be able to rotate freely through 360° which is only possible with a pin joint. Therefore, pin joint 19' cannot be replaced by an elastic joint.

The entire microengine can be fabricated of polysilicon (or other suitable materials) on one wafer using surface micromachining batch fabrication techniques which are well known in the art.

Figure 3:
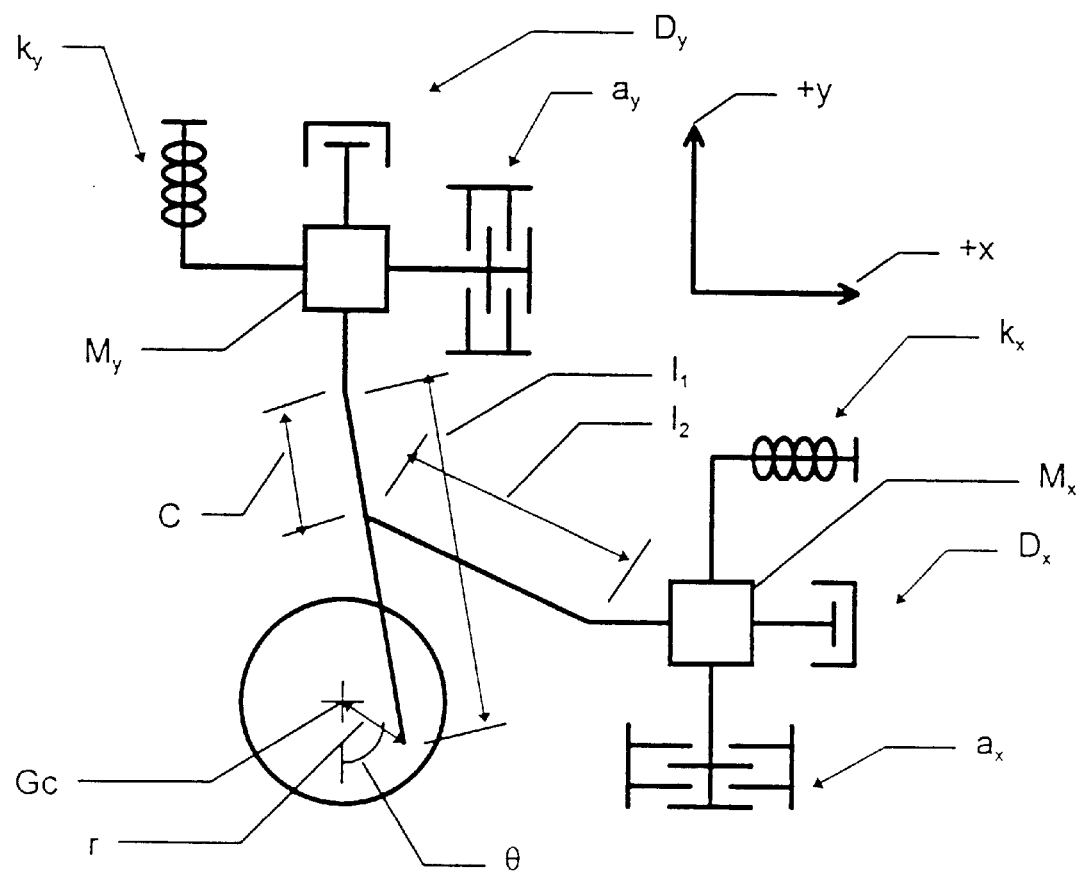
FIG. 3 is an illustration of a microengine according to the present invention.

As explained previously, specific sequencing of the forces generated by the comb drive actuators along the X and Y axes is required to obtain output torque and hence rotary motion. For selected microengine physical parameters, simple driving functions for the comb drive actuators can achieve constant rotation, insensitive to often-unknown friction in the system. The mechanical parameters of interest are shown in FIG. 3. Comb drive actuators Dx, Dy experience forces due to spring characteristics of the mechanical structures (represented by spring constants $k_x$, $k_y$), air damping (represented by damping constants $a_x$, $a_y$), electrostatic attraction (due to the drive voltage), and the mechanical linkages connecting comb drive actuators Dx, Dy to output gear G. A first linkage L1 having length $l_1$, connects comb drive actuator Dy to output gear G at an attachment point P a distance r from the center Gc of output gear G. A second linkage L2, having length $l_2$, connects comb drive actuator Dx to first linkage L1 at a distance C from the flexible connection L1c between first linkage L1 and comb drive actuator Dy. Forces acting on output gear G due to linkage L1 can be resolved into radial force $F_r$ and circumferential force $F_l$. Other quantities of interest include lumped masses $M_x$, $M_y$, the angle $\phi$ between first linkage L1 and the y axis, the angle $\alpha$ between second linkage L2 and the x axis, the angle $\theta$ from the y axis to the linkage attachment point P, and the relationship $\gamma$ given by $C/l_1$.

A microengine according to the present invention has mechanical parameters designed so that $\gamma^2 k_x = k_y$ and so that $M_x = M_y/\gamma^2$. The resulting microengine will produce constant rotation rates if comb drive actuators Dx, Dy are driven with sinusoidal forcing functions, 90 degrees out of phase with each other.

To illustrate the operation of the present invention, consider the equations for the motion of a microengine according to the present invention, neglecting the mass of the gear,:

$$\pm V_x^2 = \frac{k_x r}{\gamma a} \left( \frac{\gamma^2}{\omega_x^2} [(\theta'' + 2\delta_x \theta')\cos(\theta) - \theta'^2 \sin(\theta)] + \right. \tag{1}$$

$$\left. \gamma^2 \sin(\theta) + \frac{F_r \sin(\theta) + F_l \cos(\theta)}{k_x r} \right)$$

$$\pm V_y^2 = \frac{k_y r}{\gamma a} \left( \frac{1}{\omega_y^2} [(\theta'' + 2\delta_y \theta')\sin(\theta) + \theta'^2 \cos(\theta)] + \right. \tag{2}$$

$$\left. 1 - \cos(\theta) + \frac{-F_r \cos(\theta) + F_l \sin(\theta)}{k_y r} \right)$$

The signs of the voltages $V_x$ and $V_y$ depend on how the voltages to comb drives Dx, Dy are applied. It is acceptable to treat these terms as though they are functions that can be positive or negative. Rewriting equations (1) and (2) in slightly more compact form yields:

$$Q_x(t) = \tag{3}$$

$$\left( \frac{1}{\omega_x^2} [(\theta'' + 2\delta_x \theta')\cos(\theta) - \theta'^2 \sin(\theta)] + \sin(\theta) + \frac{F_r \sin(\theta) + F_l \cos(\theta)}{\gamma^2 k_x r} \right)$$

$$Q_y(t) = \tag{4}$$

$$\left( \frac{1}{\omega_y^2} [(\theta'' + 2\delta_y \theta')\sin(\theta) + \theta'^2 \cos(\theta)] - \cos(\theta) + \frac{-F_r \cos(\theta) + F_l \sin(\theta)}{k_y r} \right)$$

$$F_l = \mu F_r \tag{5}$$

$$Q_x(t) = \frac{\pm V_x^2 a \gamma}{\gamma^2 r k_x} \tag{6}$$

$$Q_y(t) = \frac{\pm V_y^2 a\gamma}{rk_y} - 1 \tag{7}$$

For any particular set of mechanical parameters and any frequency ω, it is possible to choose the driving functions $Q_x(t)$ and $Q_y(t)$ so that θ(t)=ωt (constant rotation means that θ increases linearly with time). However, there is in general no guarantee that θ will increase linearly with time if driven with functions chosen for a different set of parameters. This means that uncertainty as to the value of mechanical parameters can lead to non-constant rotation rates.

With a microengine according to the present invention, however, constant rotation can be achieved for diverse parameter values, as long as the relationships $\gamma^2 k_x = k_y$ and $M_x = M_y/\gamma^2$ are followed. In particular, if $Q_x(t) = A\cos(\omega t)$ and $Q_y(t) = A\sin(\omega t)$, then constant rotation is achieved provided A is greater than a critical value. Supposing that $Q_x(t) = A\cos(\omega t)$, constant rotation means that $$\theta(t) = \omega t + \alpha \tag{8}$$

$$F_r = \text{const.} \tag{9}$$

Substituting into equations (3) and (4), the terms on the right hand side are of the form $$B(\alpha, F_r)\cos(\omega t) + C(\alpha, F_r)\sin(\omega t) \tag{10}$$

By suitably choosing the constant $F_r$, and the phase α, $B(\alpha, F_r) = A$ and $C(\alpha, F_r) = 0$. A direct calculation shows that $$B(\alpha, F_r) = \cos(\alpha)\left(\frac{2\delta_x \omega}{\omega_x^2} + \frac{\mu F_r}{\gamma^2 k_x r}\right) + \sin(\alpha)\left(-\frac{\omega^2}{\omega_x^2} + 1 + \frac{F_r}{k_x \gamma^2 r}\right) \tag{11}$$

$$C(\alpha, F_r) = -\sin(\alpha)\left(\frac{2\delta_x \omega}{\omega_x^2} + \frac{\mu F_r}{\gamma^2 k_x r}\right) + \cos(\alpha)\left(-\frac{\omega^2}{\omega_x^2} + 1 + \frac{F_r}{k_x \gamma^2 r}\right) \tag{12}$$

The requirements that $B(\alpha, F_r) = A$ and $C(\alpha, F_r) = 0$ can be arranged to arrive at:

$$A(\cos(\alpha) - \mu\sin(\alpha)) = \frac{2\delta_x \omega}{\omega_x^2} - \mu\left(1 - \frac{\omega^2}{\omega_x^2}\right) \tag{13}$$

$$\frac{F_r}{k_x \gamma^2 r} = A\sin(\alpha) + \frac{\omega^2}{\omega_x^2} - 1 \tag{14}$$

Equation (13) can be solved independently of equation (14). Once α is determined from equation (13), $F_r$ can be found explicitly. Note that unless $$\frac{2\delta \omega}{\omega_x^2} - \mu\left(1 - \frac{\omega^2}{\omega_x^2}\right) = 0$$

then if A is small enough there is no solution for α. Also, if A is large enough then a solution for α is guaranteed. In particular as A→∞ then cot(α)=μ.

In the present invention $\gamma^2 k_x = k_y$ and $M_x = M_y/\gamma^2$, so the terms on the right hand side of equation (14) are identical to the terms on the right hand side of equation (13), but phase shifted by 90 degrees. This means that if $Q_y(t) = A\sin(\omega t)$, then θ determined by the solution to equation (13) will automatically satisfy equation (14) as well. It follows that the microengine according to the present invention will achieve constant rotation provided only that A is large enough that there is a solution to equation (13).

Note also that a microengine according to the present invention will achieve constant rotation even if $F_r$ and $F_l$ are related nonlinearly. The analysis above assumed that $F_l = \mu F_r$. However, a similar analysis holds for the more general case $F_l = G(F_r)$, where G is a more general function. This general function could include not only nonlinear friction terms, but also the effect of a constant output torque. For linear friction and a constant output torque, equation (4) would become $F_l = \mu F_r + K$, where K is linearly proportional to the output torque. More complicated equations will result for the determination of α, but satisfaction of the first of the equations will still guarantee satisfaction of the second.

Constant rotation in a microengine according to the present invention is also stable. $F_r$ can be eliminated from the equations of motion by multiplying equation (3) by $-\cos(\theta) + \mu\sin(\theta)$, multiplying equation (4) by $\sin(\theta) + \mu\cos(\theta)$, and subtracting the results, resulting in $$A(\mu\sin(\theta - \omega t) - \cos(\theta - \omega t)) = -\frac{1}{\omega_x^2}(\theta'' + 2\delta_x \theta') + \mu\left(1 - \frac{\theta'^2}{\omega_x^2}\right) \tag{15}$$

Making the substitution φ=θ−ωt produces $$A(\mu\sin(\phi) - \cos(\phi)) = -\frac{1}{\omega_x^2}(\theta'' + 2\delta_x(\omega + \phi')) + \mu\left(1 - \frac{(\phi' + \omega)^2}{\omega_x^2}\right) \tag{16}$$

Equation (16) has the equilibrium solution φ=α where α satisfies equation (13). The stability of the solution can be calculated by assuming that φ=α+ξ(t). Assuming that ξ(t) <<1 produces the linearized equation:

$$\xi'' + \xi'(2\delta_x + 2\mu\omega) + \omega_x^2 A\,(\mu\cos(\alpha) + \sin(\alpha))\xi = 0 \tag{17}$$

The solution will be stable provided that $$A(\mu\cos(\alpha) + \sin(\alpha)) > 0 \tag{18}$$

Provided A is large enough that a constant rotation solution exists, there will always be one stable solution and one unstable solution. As already noted, A→∞ leads to cos(α)−μsin(α)=0. There are two possible solutions: one in the first quadrant, and one in the third quadrant. The first quadrant solution satisfies the stability condition, the third quadrant solution does not. Decreasing A eventually leads to merging the two solutions. The point at which they merge is exactly the point at which μcos(α)+sin(α)=0.

Figure 4:
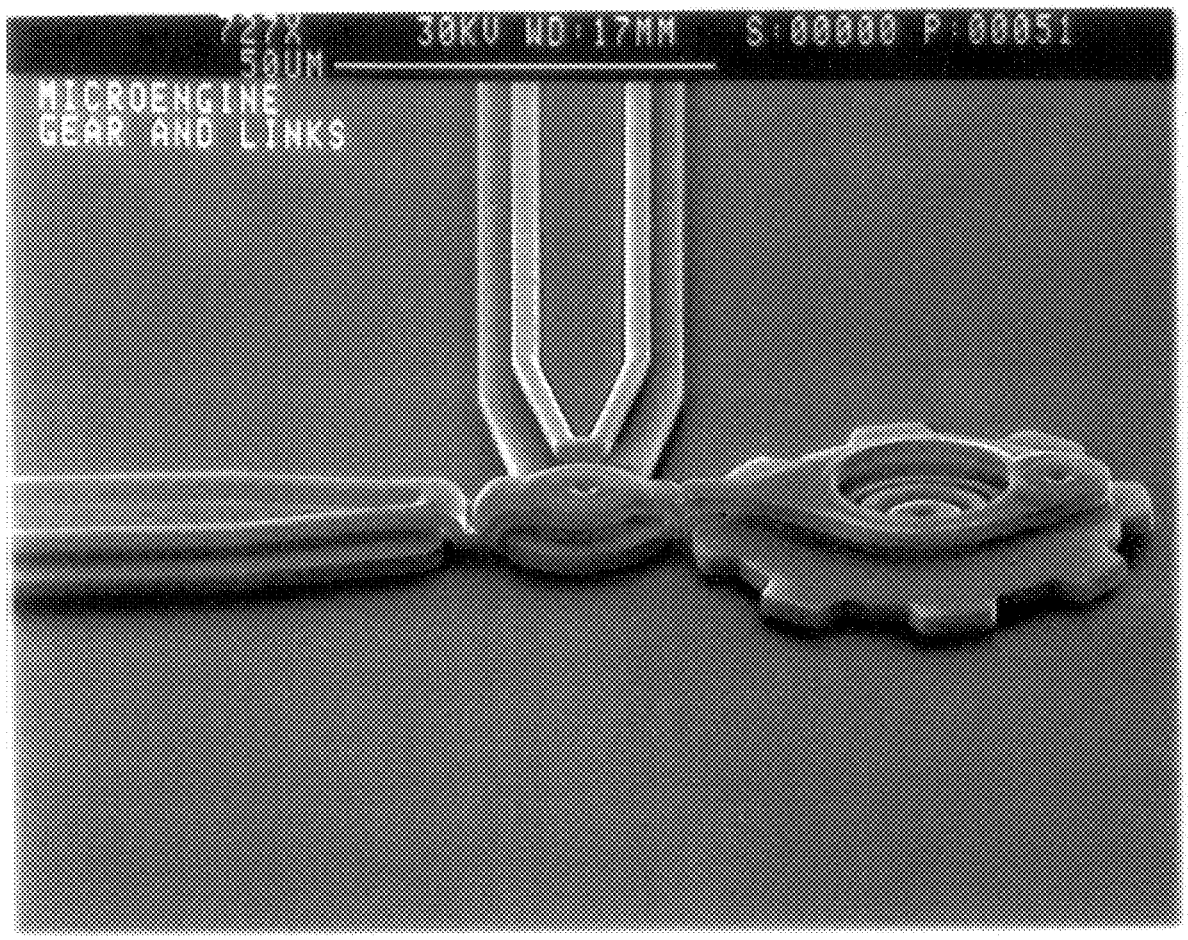
FIG. 4 is a scanning electron micrograph (SEM) of a microengine gear and output assembly according to the present invention.
Figure 5:
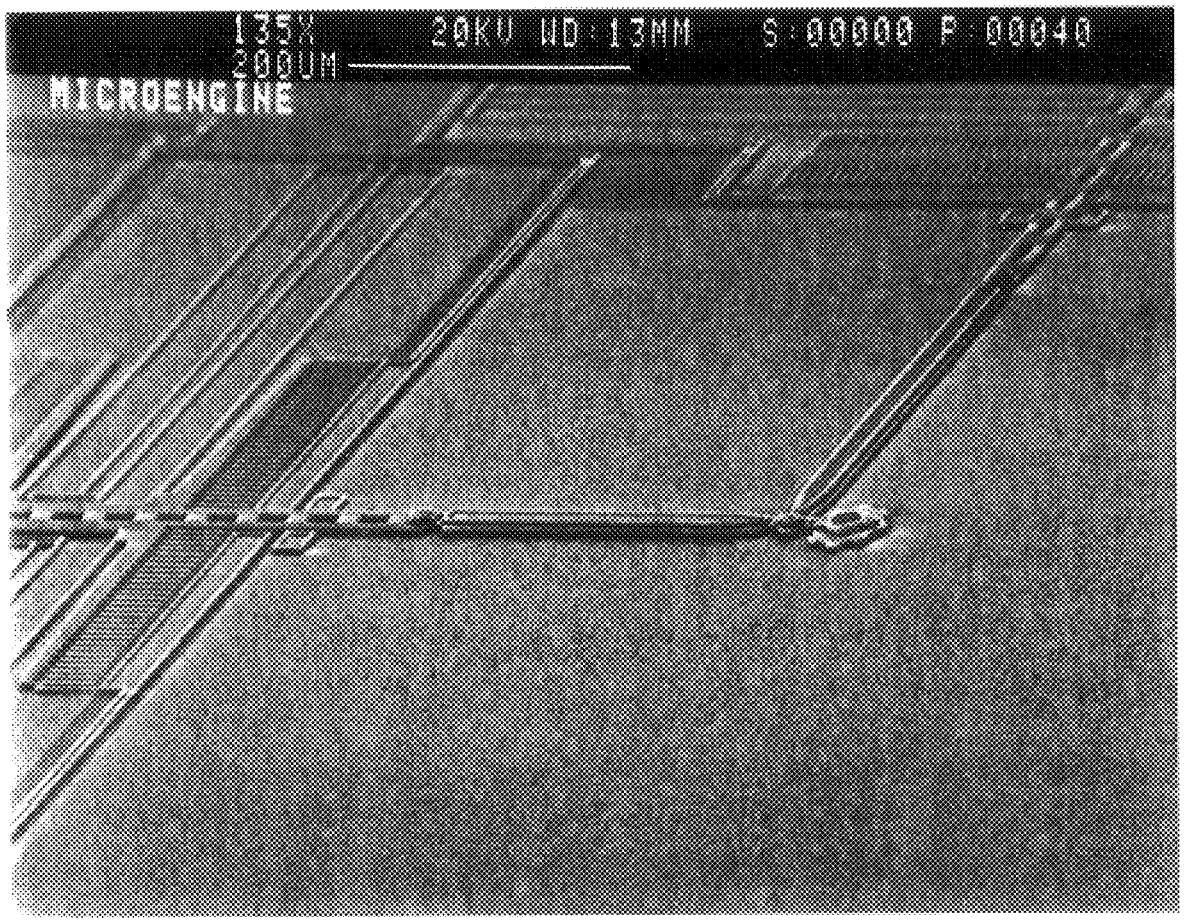
FIG. 5 is a SEM of a microengine according to the present invention showing the output gear, links, and portions of the linear actuator.
Figure 6:
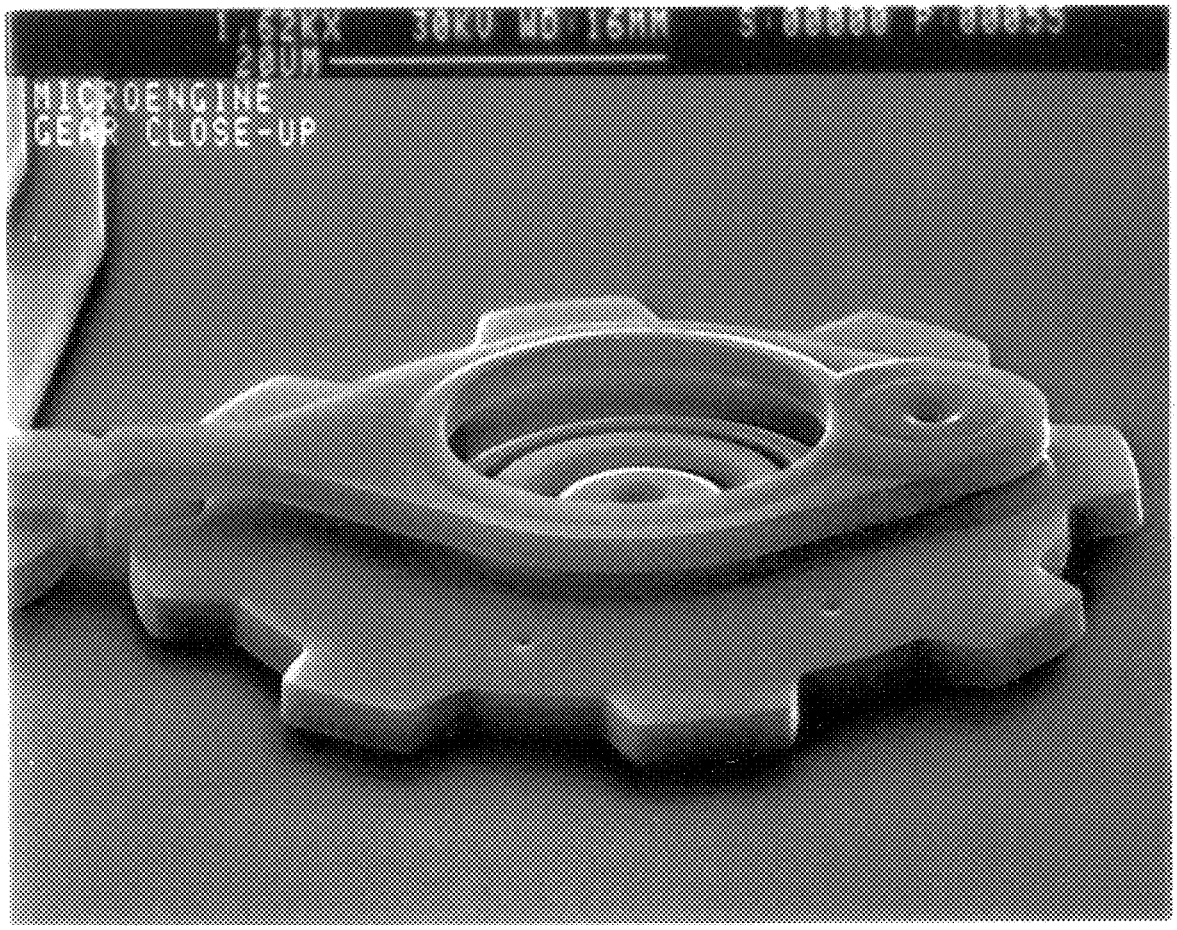
FIG. 6 is a SEM showing a flexible joint.

To further illustrate the configuration of the microengine after fabrication, FIG. 4 is a scanning electron micrograph (SEM) and illustrates the links and output gear assembly of the microengine device. FIG. 5 is an SEM showing links, output gear, and linear actuators for the microengine. FIG. 6 is an SEM illustrating a flex joint which can replace pin joints, thus simplifying mechanical aspects of the microengine.

The microengine can constitute a fundamental power source for operating microsized devices and hence the analogy to macroscale electromagnetic motors. Applications for the microengine would include positioning, handling, aligning and sorting mechanisms, sensing mechanisms, cutting and slicing tools, material removal tools, driving of pumping mechanisms, microrobotic power sources, micro hard disk drives, switching device operation such as mechanical valves, optical shutters, and electrical switches. Fields of application include defense, medical, manufacturing, consumer products, aviation, automotive, computer, inspection, and safety systems.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A microengine comprising:
    a) a substrate base;
    b) a mechanical output gear rotatably attached to said substrate base, said gear for providing direct rotational power to a micromechanism;
    c) a first linear actuator formed on said substrate base, characterized by a mass $M_1$ and a spring constant $k_1$, and linked to said mechanical output gear near the outer perimeter thereof by a first linkage having a length $l_1$;
    d) a second linear actuator formed on said substrate base, characterized by a mass $M_2$ and a spring constant $k_2$, and linked to said first linkage by a second linkage having a length $l_2$ at a point a distance $d_1$ from the connection between said first linkage and said first linear actuator;
    e) wherein the mass $M_2$ is substantially equal to the mass $M_1$ divided by the square of the ratio of the distance $d_1$ to the length $l_1$; and
    f) wherein the spring constant $k_2$ is substantially equal to the spring constant $k_1$ divided by the square of the ratio of the distance $d_1$ to the length $l_1$.

2. The microengine of claim 1, wherein said first linear actuator is driven with a first forcing function wherein the square of the forcing voltage is sinusoidal, and wherein said second linear actuator is driven with a second forcing function wherein the square of the forcing voltage plus a constant is sinusoidal.

3. The microengine of claim 1, wherein the first forcing function is shifted 90 degrees in phase from the second forcing function.

4. The microengine of claim 1, wherein said linear actuators are electrostatic comb drive actuators.

5. The microengine of claim 1, wherein said mechanical output gear comprises teeth at its outermost perimeter.

6. The microengine of claim 1, wherein said invention is fabricated of polysilicon on one wafer using surface micromachining batch fabrication.

7. The microengine of claim 1, wherein said linkage means is flexible to allow rotational motion at said mechanical output gear.

8. A microengine batch fabricated by polysilicon surface micromachining techniques comprising:
    a) a mechanical output gear formed upon and rotatably attached to a substrate base;
    b) a first linear actuator, responsive to a first drive function and characterized by a mass $M_1$ and a spring constant $k_1$, formed on said substrate base and positioned along an X axis relative to said output gear;
    c) a second linear actuator, responsive to a second drive function and characterized by a mass $M_2$ and a spring constant $k_2$, formed on said substrate base and positioned along a Y axis, substantially orthogonal to the X axis, relative to said output gear and said first linear actuator wherein said second actuator is positioned between said output gear and said first linear actuator;
    d) a first linkage means, having a length $l_1$, for rotatably linking said first linear actuator to said output gear, wherein said first linkage means is connected to said output gear near said output gear's outer perimeter; and
    e) a second linkage means, having a length $l_2$, for linking said second linear actuator to said first linkage means at a distance $d_1$ from said first linear actuator;
    f) wherein the mass $M_2$ is substantially equal to the mass $M_1$ divided by the square of the ratio of the distance $d_1$ to the length $l_1$; and
    g) wherein the spring constant $k_2$ is substantially equal to the spring constant $k_1$ divided by the square of the ratio of the distance $d_1$ to the length $l_1$.

9. The microengine of claim 8, wherein said first drive function comprises a first forcing function wherein the square of the forcing voltage is sinusoidal, and wherein said second drive function comprises a second forcing function wherein the square of the forcing voltage plus a constant is sinusoidal, and wherein the second drive function is 90 degrees out of phase with said first drive function.

10. The microengine of claim 8, wherein said actuators are electrostatic comb drive actuators.

11. The microengine of claim 8, wherein said mechanical output gear further comprises teeth on its outer perimeter, said teeth adapted for directly contacting a micromechanism.

12. The microengine of claim 8, wherein said microengine output gear is fabricated on a silicon substrate and is smaller than 40 micrometers in diameter.

13. The microengine of claim 8, wherein said first linkage means is flexible to allow rotational motion at said output mechanical gear.

14. A microfabricated microengine made of polysilicon on a silicon substrate base comprising:
    a) a mechanical output gear having teeth on its outermost surface adapted for providing rotational motion to a mechanical load;
    b) a retaining hub formed on and attached to said substrate base for rotatably securing said output gear and allowing the output gear to rotate;
    c) a first linear actuator, responsive to a first drive function and characterized by a mass $M_1$ and a spring constant $k_1$, formed on said substrate base and positioned along an X axis relative to said output gear;
    d) a second linear actuator, responsive to a second drive function and characterized by a mass $M_2$ and a spring constant $k_2$, formed on said substrate base and positioned along a Y axis, substantially orthogonal to the X axis, relative to said output gear wherein said second actuator is positioned between said output gear and said first linear actuator;
    e) a first linkage means, having a length $l_1$, for rotatably linking said first linear actuator to said output gear, wherein said linkage is rotatably connected to said output gear near said output gear's perimeter; and
    f) a second linkage means, having a length $l_2$, for flexibly linking said second linear actuator to said first linkage means at a distance $d_1$ from said first linear actuator;
    g) wherein the mass $M_2$ is substantially equal to the mass $M_1$ divided by the square of the ratio of the distance $d_1$ to the length $l_1$; and
    h) wherein the spring constant $k_2$ is substantially equal to the spring constant $k_1$ divided by the square of the ratio of the distance $d_1$ to the length $l_1$.

15. The microfabricated microengine of claim 14, wherein said first drive function comprises a first forcing function wherein the square of the forcing voltage is sinusoidal, and wherein said second drive function comprises a second forcing function wherein the square of the forcing voltage plus a constant is sinusoidal.

16. The microfabricated microengine of claim 14, wherein said actuators are electrostatic comb drive actuators.

17. The microfabricated microengine of claim 14, wherein said linkage means is flexible to allow rotational motion at said mechanical output gear.

18. The microfabricated microengine of claim 14, wherein said mechanical output gear is retained by a retaining means which allows said mechanical output gear to rotate freely.

19. The microfabricated microengine of claim 14, wherein said mechanical output gear is smaller than 40 micrometers and said microengine is smaller than 9 micrometers in thickness.

* * * * *